(12) United States Patent
Schwartz

(10) Patent No.: US 7,461,478 B2
(45) Date of Patent: Dec. 9, 2008

(54) TRAP FOR BURROWING ANIMALS

(76) Inventor: Leroy Schwartz, 524 Aspen Drive, Swift Current, SK (CA) S9H 5E4

( * ) Notice: Subject to any disclaimer, the term of this patent is extended or adjusted under 35 U.S.C. 154(b) by 83 days.

(21) Appl. No.: 11/691,793

(22) Filed: Mar. 27, 2007

(65) Prior Publication Data

US 2008/0127544 A1    Jun. 5, 2008

(30) Foreign Application Priority Data

Dec. 1, 2006    (CA) .................................. 2569811

(51) Int. Cl.
*A01M 23/20*    (2006.01)
(52) U.S. Cl. ..................... 43/78; 43/80; 43/85
(58) Field of Classification Search ............... 43/78, 43/61, 77, 80, 85–87
See application file for complete search history.

(56) References Cited

U.S. PATENT DOCUMENTS

| | | | | |
|---|---|---|---|---|
| 546,886 A * | 9/1895 | Hoover | ........................... | 43/80 |
| 563,682 A * | 7/1896 | Parker | ........................... | 43/80 |
| 0,687,226 A | 11/1901 | Gorr | | |
| 0,861,174 A | 7/1907 | Heil | | |
| 0,898,262 A | 9/1908 | Renken | | |
| 0,954,996 A | 4/1910 | Renken | | |
| 1,571,432 A * | 2/1926 | Powell | ........................... | 43/85 |
| 1,643,602 A * | 9/1927 | Boerner | ........................... | 43/85 |
| 2,059,164 A | 10/1936 | Woods | | |
| 2,148,813 A | 2/1939 | Hosmer | | |
| 2,257,299 A * | 9/1941 | Herstedt | ........................... | 43/85 |
| 2,475,467 A | 7/1949 | Alvau | | |
| 2,542,942 A * | 2/1951 | Purlee | ........................... | 43/78 |
| 2,603,029 A | 7/1952 | Anderson | | |
| 2,778,148 A * | 1/1957 | Schmidt | ........................... | 43/80 |
| 3,013,358 A * | 12/1961 | Wilken | ........................... | 43/80 |
| 4,016,672 A * | 4/1977 | Joncas | ........................... | 43/78 |
| 4,494,335 A * | 1/1985 | Gaines | ........................... | 43/80 |
| 4,858,373 A * | 8/1989 | Combs | ........................... | 43/61 |

* cited by examiner

*Primary Examiner*—Kimberly S Smith
(74) *Attorney, Agent, or Firm*—Standley Law Group LLP

(57) ABSTRACT

A trap apparatus includes an elongated base plate defining a trap aperture in a lower portion thereof, and a pointed bottom end. Slide grooves are defined along each side of the base plate. A trigger arm extends over the trap aperture, and is pivotally attached to move away from and toward the base plate. A slide plate is engaged in the slide grooves and slides up to a raised cocked position where the slide plate is above the trap aperture, to a lower tripped position. A bias element exerts a downward bias force on the slide plate toward the tripped position. Trip elements on the arm and slide plate engage to maintain the slide plate in the cocked position. Movement of the lower end of the trigger arm away from the base plate releases the slide plate to move to the tripped position in response to the bias force.

16 Claims, 1 Drawing Sheet

TRAP FOR BURROWING ANIMALS

CROSS-REFERENCE TO RELATED APPLICATIONS

This application claims foreign priority based upon Canadian Patent Application Serial No. 2,569,811, filed Dec. 1, 2006, the content of which is incorporated by reference as if fully recited herein.

TECHNICAL FIELD

This invention relates to traps and in particular to traps set at the opening of a burrow made by a burrowing animal.

BACKGROUND

Burrowing animals such as gophers and ground hogs cause considerable damage to fields, gardens, and like agricultural and horticultural locations. These animals typically dig tunnels or burrows where they live, disrupting the soil surface for a considerable area around the mouth or entrance of the burrows. The animals leave the burrow to find food, and that food commonly comprises desirable horticultural and agricultural plants growing close by, destroying the plants.

Thus considerable effort has been directed toward designing traps suitable to trap and kill burrowing animals. These traps are generally of two types—those traps where the animal is grasped by the trap, and those where it is stabbed or impaled by the trap. Stabbing traps typically include sharpened forks or spikes that are forced downward by a spring into an animal that trips a trigger.

Stabbing traps are disclosed for example in U.S. Pat. No. 898,262 to Renken, U.S. Pat. No. 687,226 to Gorr, and U.S. Pat. No. 861,174 to Heil. These traps include stakes at bottoms thereof and are positioned in a location where a burrowing animal is likely to pass, for example over or near the mouth of a burrow, by pushing the stakes into the ground. Another stabbing trap, disclosed in U.S. Pat. No. 954,996 again to Renken is located by making an excavation and seating the trap at or near the entrance of the burrow.

Stabbing traps are messy, as blood and gore is necessarily spread about in the area when an animal is stabbed. The resulting mess is distasteful.

Grasping traps in contrast can simply hold the animal, or more commonly kill the animal by strangulation, as it is often the neck area where pressure is applied by these traps. Blood and gore generally does not result from using grasping traps. Examples of grasping traps for use with burrowing animals are disclosed in U.S. Pat. No. 2,603,029 to Anderson, U.S. Pat. No. 2,475,467 to Alvau, and U.S. Pat. No. 2,148,813 to Hosmer. For use with burrowing animals, it is described that an excavation is made to place them in the underground burrow in the path of the burrowing animals. Thus it is required to locate the burrow underground, which can be problematic.

U.S. Pat. No. 2,059,164 to Woods discloses a trap similar to that of Anderson, but no directions are given for use with burrowing animals, and it is described as being used to hang over an animal hole in a wall.

SUMMARY OF THE INVENTION

It is an object of the present invention to provide a trap for burrowing animals that overcomes problems in the prior art.

In a first embodiment the present invention provides a trap apparatus comprising an elongated base plate defining a trap aperture in a lower portion thereof, and a pointed bottom end below the trap aperture. Slide grooves are defined along each side of the base plate adjacent to a first surface of the base plate. A trigger arm has a lower end extending over the trap aperture, and is pivotally attached at an upper end thereof to the base plate at a pivot location in a middle portion of the base plate above the trap aperture such that the trigger arm can move away from and toward the first surface of the base plate. A slide plate is engaged in the slide grooves such that the slide plate can slide up and down in the grooves between the trigger arm and the first surface of the base plate from a raised cocked position where a lower edge of the slide plate is substantially above the trap aperture, to a lower tripped position wherein the lower edge of the slide plate extends across the trap aperture. A bias element is operative, when the slide plate is in the cocked position, to exert a downward bias force on the slide plate toward the tripped position. An arm trip element is mounted on a middle portion of the trigger arm and configured to engage a corresponding slide trip element mounted on a middle portion of the slide plate to maintain the slide plate in the cocked position. Movement of the lower end of the trigger arm away from the base plate releases the arm trip element from engagement with the slide trip element and allows the slide plate to move to the tripped position in response to the bias force.

In a second embodiment the present invention provides method of trapping a burrowing animal where the burrowing animal makes a burrow with an entrance hole comprising a crater with sloped walls, and a burrow mouth in a sloped wall of the crater. The method comprises providing a trap apparatus comprising an elongated base plate defining a trap aperture in a lower portion thereof, and a pointed bottom end below the trap aperture; slide grooves defined along each side of the base plate adjacent to a first surface of the base plate; a trigger arm having a lower end extending over the trap aperture, and pivotally attached at an upper end thereof to the base plate at a pivot location in a middle portion of the base plate above the trap aperture such that the trigger arm can move away from and toward the first surface of the base plate; a slide plate engaged in the slide grooves such that the slide plate can slide up and down in the grooves between the trigger arm and the first surface of the base plate from a raised cocked position where a lower edge of the slide plate is substantially above the trap aperture, to a lower tripped position wherein the lower edge of the slide plate extends across the trap aperture; a bias element operative, when the slide plate is in the cocked position, to exert a downward bias force on the slide plate toward the tripped position; an arm trip element mounted on a middle portion of the trigger arm and configured to engage a corresponding slide trip element mounted on a middle portion of the slide plate to maintain the slide plate in the cocked position; wherein movement of the lower end of the trigger arm away from the base plate releases the arm trip element from engagement with the slide trip element and allows the slide plate to move to the tripped position in response to the bias force. The pointed bottom end of the base plate is pushed into the ground at the bottom of the crater such that the base plate is supported in the ground with a second surface of the base plate facing the burrow mouth and the trap aperture aligned with the burrow mouth and the lower end of the trigger arm extending over the trap aperture opposite the burrow mouth such that a burrowing animal exiting the burrow will contact the lower end of the trigger arm and push the lower end of the trigger arm away from the base plate. The slide plate is moved to the raised cocked position and the arm trip element and the slide trip element are engaged to maintain the slide plate in the cocked position.

The present inventor has recognized that the entrance to a burrow, for burrowing animals like gophers in any event, is most commonly quite wide compared to the burrow itself, rather than a substantially horizontally oriented hole in the ground surface, for example as illustrated in the prior U.S. Pat. No. 898,262 patent of Renken. As a result the entrance is typically a crater like depression with a burrow leading off at a downward angle from the bottom of the sloping wall of the crater and the mouth of the burrow formed in the sloping wall. The crater wall thus allows the present trap to be conveniently stuck into the ground with the trap opening coincidental with the burrow mouth at the bottom of the crater wall.

The trap apparatus is simple and economical to manufacture and assemble, and compact to facilitate shipping.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
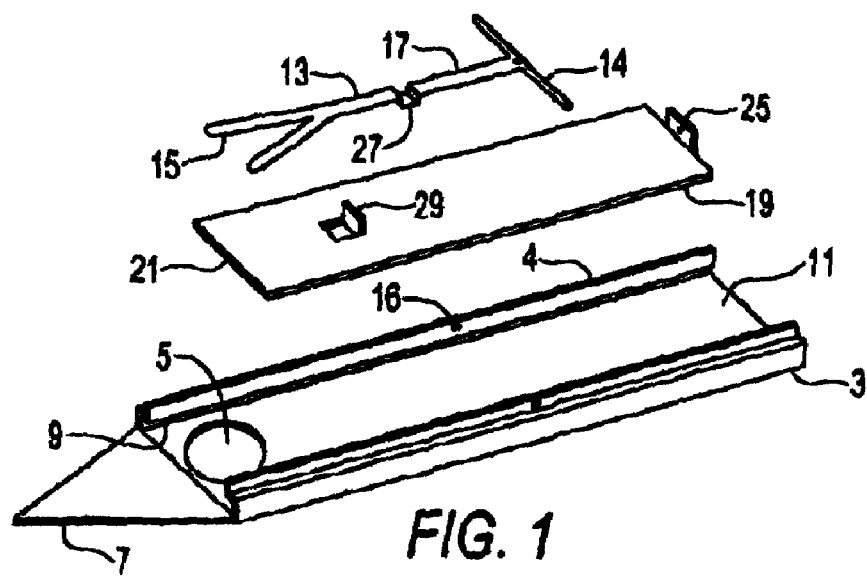
FIG. 1 is a perspective view of disassembled parts of an embodiment of a trap apparatus of the present invention.
Figure 2:
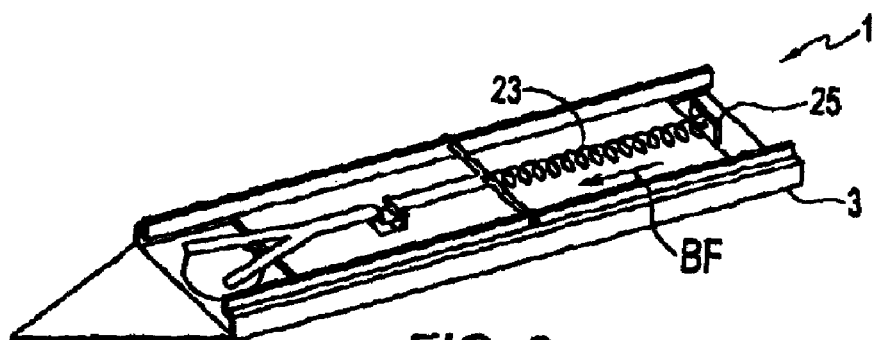
FIG. 2 is a perspective view of the embodiment of FIG. 1 with parts assembled and bias element installed.

FIGS. 1 and 2 illustrate an embodiment of a trap apparatus 1 of the present invention. The apparatus 1 comprises an elongated base plate 3 defining a trap aperture 5 in a lower portion thereof, and a pointed bottom end 7 below the trap aperture 5. The trap aperture 5 is configured to allow a burrowing animal that is to be trapped to pass therethrough. Slide grooves 9 are defined along each side of the base plate 3 adjacent to a first surface 11 of the base plate 3.

The illustrated base plate 3 includes right and left side walls 4 extending upward along corresponding right and left sides of the base plate 3 above the grooves 9. The walls 4 somewhat reduce the occurrence of soil fouling the grooves 9 during use by preventing soil from falling onto the first surface 11.

A trigger arm 13 has a lower end 15 extending over the trap aperture 5, and pivotally attached at an upper end 17 thereof to the base plate 3 at a pivot location in a middle portion of the base plate 3 above the trap aperture 5 such that the trigger arm 13 can move away from and toward the first surface 11 of the base plate 3. The illustrated trigger arm 13 is attached to a cross member 14 that extends from one side wall to the other and through holes 16 in the walls 4 such that the cross member 14 can rotate in the holes 16 to allow the trigger arm 13 to pivot to move away from and toward the first surface 11 of the base plate 13.

A slide plate 19 is engaged in the slide grooves 9 such that the slide plate 19 can slide up and down in the grooves 9 between the trigger arm 13 and the base plate 3 from a raised cocked position, illustrated in FIG. 2 where a lower edge 21 of the slide plate 19 is above the trap aperture 5, to a lower tripped position wherein the lower edge 21 of the slide plate 19 extends across the trap aperture 5.

A bias element, illustrated as spring 23, is operative, when the slide plate 19 is in the cocked position of FIG. 2, to exert a downward bias force BF on the slide plate 19 toward the tripped position. The spring 23 is connected between the cross member 14 and a flange 25 extending up from the top end of the slide plate 19.

An arm trip element, illustrated as an arm lug 27 extends from the middle portion of the arm 13 toward the base plate 3, and is configured to engage a corresponding slide trip element, illustrated as a slide lug 29 extending from the middle portion of the slide plate 19 toward the arm 13, to maintain the slide plate 19 in the cocked position. In the illustrated embodiment, the arm lug 27 is conveniently provided by bending the trigger arm 13 into a kink at a midpoint thereof, and the slide lug 29 is conveniently provided by punching a flap out of the slide plate 19 and bending up the punched out flap. Depending on the materials used, the lugs 27, 29 can be provided in a variety of ways.

When engaged as in FIG. 2, the slide lug 29 bears against the arm lug 27 in response to the bias force BF exerted on the slide plate 19. Movement of the lower end 15 of the trigger arm 13 away from the base plate 3 moves the arm lug 27 up to release the slide lug 29 and allows the slide plate 19 to move to the tripped position in response to the bias force BF.

Figure 3:
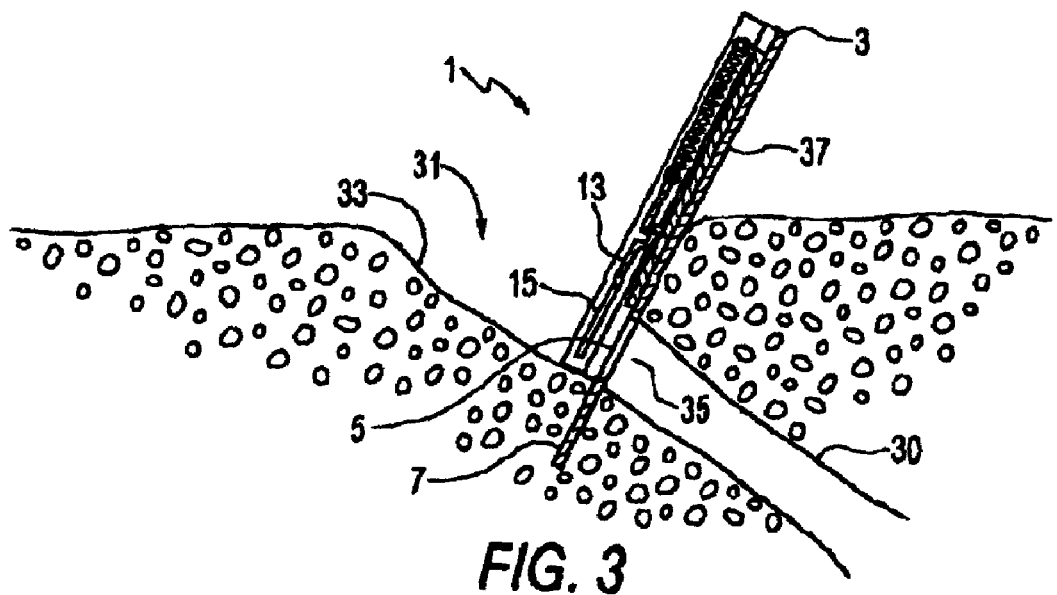
FIG. 3 is a schematic sectional side view of the trap apparatus of FIG. 1 installed in the entrance of a burrow of an animal to be trapped.

FIG. 3 illustrates a method of trapping a burrowing animal where the burrowing animal makes a burrow 30 with an entrance hole comprising a crater 31 with sloped walls 33, and a burrow mouth 35 in the sloped wall 33. The method comprises providing a trap apparatus 1 of FIGS. 1 and 2, and pushing the pointed bottom end 7 of the base plate 3 into the ground at the bottom of the crater such that the base plate 3 is supported in the ground with a second surface 37 of the base plate 3, opposite the trigger arm 13, facing the burrow mouth 35 and the trap aperture 5 aligned with the burrow mouth 35 and the lower end 15 of the trigger arm 13 extending over the trap aperture 5 opposite the burrow mouth 35.

The slide plate 19 is raised to the cocked position and the arm lug and the slide lug are engaged to maintain the slide plate 19 in the cocked position. A burrowing animal exiting the burrow 30 will contact the lower end 15 of the trigger arm 13 and push it away from the base plate 3, tripping the slide plate 19 and catching the animal. Typically the lower edge of the slide plate 19 will contact the animal's neck, forcing it against the opposite edge of the trap aperture 5, and choking the animal.

The animal is removed from the trap by simply grasping the top end of the apparatus 1 and pulling back the slide plate 19 to release the animal, conveniently into a pail or like container to be taken away for disposal. The slide plate 19 can then be cocked again and the apparatus 1 pushed into the ground adjacent the same burrow mouth 30, or another one.

The lower end 15 of the trigger arm 13 is Y-shaped to substantially prevent a burrowing animal from entering the burrow mouth 30. A burrowing animal, or any other animal, attempting to enter the mouth 30 will be blocked and even if tripped by an animal on the outside the trap is not likely to cause significant harm to the animal. At the same time, the burrowing animal leaving the burrow will see a space between the arms of the Y and not be deterred from attempting to leave.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A trap apparatus comprising:
   an elongated base plate defining a trap aperture in a lower portion thereof, and a pointed bottom end below the trap aperture;
   slide grooves defined along each side of the base plate adjacent to a first surface of the base plate;
   a trigger arm having a lower end extending over the trap aperture, and pivotally attached at an upper end thereof to the base plate at a pivot location in a middle portion of the base plate above the trap aperture such that the trigger arm can move away from and toward the first surface of the base plate;
   a slide plate engaged in the slide grooves such that the slide plate can slide up and down in the grooves between the trigger arm and the first surface of the base plate from a raised cocked position where a lower edge of the slide plate is substantially above the trap aperture, to a lower tripped position wherein the lower edge of the slide plate extends across the trap aperture;
   a bias element operative, when the slide plate is in the cocked position, to exert a downward bias force on the slide plate toward the tripped position;
   an arm trip element mounted on a middle portion of the trigger arm and configured to engage a corresponding slide trip element mounted on a middle portion of the slide plate to maintain the slide plate in the cocked position;
   wherein movement of the lower end of the trigger arm away from the base plate releases the arm trip element from engagement with the slide trip element and allows the slide plate to move to the tripped position in response to the bias force.

2. The apparatus of claim 1 wherein the base plate includes right and left side walls extending upward along corresponding right and left sides of the base plate above the grooves.

3. The apparatus of claim 2 wherein the trigger arm is attached to a cross member that extends from the right side wall to the left side wall.

4. The apparatus of claim 3 wherein the cross member extends through holes in each side wall such that the cross member can rotate in the holes to allow the trigger arm to pivot to move away from and toward the first surface of the base plate.

5. The apparatus of claim 3 wherein the bias element comprises a spring connected between the cross member and the slide plate.

6. The apparatus of claim 1 wherein the arm trip element comprises an arm lug extending from the middle portion of the arm toward the base plate, and the slide trip element comprises a slide lug extending from the middle portion of the slide plate toward the arm, and wherein when engaged the slide lug bears against the arm lug in response to the bias force.

7. The apparatus of claim 1 wherein the lower end of the trigger arm is configured to substantially prevent a burrowing animal from entering the burrow mouth.

8. The apparatus of claim 7 wherein the lower end of the trigger arm is Y-shaped.

9. A method of trapping a burrowing animal where the burrowing animal makes a burrow with an entrance hole comprising a crater with sloped walls, and a burrow mouth in a sloped wall of the crater, the method comprising:

providing a trap apparatus comprising:
      an elongated base plate defining a trap aperture in a lower portion thereof, and a pointed bottom end below the trap aperture;
      slide grooves defined along each side of the base plate adjacent to a first surface of the base plate;
      a trigger arm having a lower end extending over the trap aperture, and pivotally attached at an upper end thereof to the base plate at a pivot location in a middle portion of the base plate above the trap aperture such that the trigger arm can move away from and toward the first surface of the base plate;
      a slide plate engaged in the slide grooves such that the slide plate can slide up and down in the grooves between the trigger arm and the first surface of the base plate from a raised cocked position where a lower edge of the slide plate is substantially above the trap aperture, to a lower tripped position wherein the lower edge of the slide plate extends across the trap aperture;
      a bias element operative, when the slide plate is in the cocked position, to exert a downward bias force on the slide plate toward the tripped position;
      an arm trip element mounted on a middle portion of the trigger arm and configured to engage a corresponding slide trip element mounted on a middle portion of the slide plate to maintain the slide plate in the cocked position;
      wherein movement of the lower end of the trigger arm away from the base plate releases the arm trip element from engagement with the slide trip element and allows the slide plate to move to the tripped position in response to the bias force;
   pushing the pointed bottom end of the base plate into the ground at the bottom of the crater such that the base plate is supported in the ground with a second surface of the base plate facing the burrow mouth and the trap aperture aligned with the burrow mouth and the lower end of the trigger arm extending over the trap aperture opposite the burrow mouth such that a burrowing animal exiting the burrow will contact the lower end of the trigger arm and push the lower end of the trigger arm away from the base plate;
   moving the slide plate to the raised cocked position and engaging the arm trip element and the slide trip element to maintain the slide plate in the cocked position.

10. The method of claim 9 further comprising reducing an occurrence of soil fouling the grooves by providing a base plate that includes right and left side walls extending upward along corresponding right and left sides of the base plate above the grooves.

11. The method of claim 10 wherein the trigger arm is attached to a cross member that extends from the right side wall to the left side wall.

12. The method of claim 11 wherein the cross member extends through holes in each side wall such that the cross member can rotate in the holes to allow the trigger arm to pivot to move away from and toward the first surface of the base plate.

13. The method of claim 11 wherein the bias element comprises a spring connected between the cross member and the slide plate.

14. The method of claim 9 wherein the arm trip element comprises an arm lug extending from the middle portion of the arm toward the base plate, and the slide trip element comprises a slide lug extending from the middle portion of the slide plate toward the arm, and wherein when engaged the slide lug bears against the arm lug in response to the bias force.

15. The method of claim 9 further comprising configuring the lower end of the trigger arm to substantially prevent a burrowing animal from entering the burrow mouth.

16. The method of claim 15 comprising configuring the lower end of the trigger arm in a Y shape.

* * * * *